UNITED STATES PATENT OFFICE.

FRANK ROCKWOOD HALL, OF BOSTON, MASSACHUSETTS.

COMPOSITION OF MATTER.

SPECIFICATION forming part of Letters Patent No. 571,117, dated November 10, 1896.

Application filed March 6, 1896. Serial No. 582,116. (No specimens.)

*To all whom it may concern:*

Be it known that I, FRANK ROCKWOOD HALL, a citizen of the United States, residing at Boston, in the county of Suffolk and State of Massachusetts, have invented certain new and useful Improvements in Compositions of Matter, of which the following is a specification, reference being had therein to the accompanying drawings.

My invention has for its object to provide a satisfactory molding composition from which molded articles, such as photograph-trays and the like, may be formed.

The invention consists in a composition of matter which is hereinafter set forth, and in the claim at the close of this specification I have pointed out and clearly defined the novel features thereof.

My material is composed of roofing-pitch which has been treated as hereinafter set forth, combined with gum-kauri and asbestos, in the manner and substantially in the proportions hereinafter set forth.

I procure the material ordinarily known as "roofing-pitch," which is a commercial pitch made by the distillation of coal-tar, and distil it by the aid of heat in either an open or closed vessel. A part of the oil which it contains is thus driven off and the melting-point of the residuum is raised in proportion as the oil is removed. I proceed with the distillation until a residuum is produced which has a considerably higher melting-point than the original pitch. For example, the original pitch, as commercially obtainable, will melt in the presence of a degree of heat less than 129° Fahrenheit, while after distillation for a sufficient length of time to produce a residuum or pitch such as I employ in my invention the melting-point of the said residuum or pitch will be in the neighborhood of 170° Fahrenheit.

I combine the materials employed in the following manner: I employ hot grinding-rolls, to the action of which the residuum or pitch, which has been obtained as above set forth, is subjected, the proportion of pitch used being about nine parts by weight. While the pitch is subjected to the action of the grinding-rolls I add to it the asbestos fiber, using about five parts by weight of the latter. After the latter has been thoroughly incorporated with the pitch I add about four parts by weight of gum-kauri, and thoroughly mix and incorporate the whole in the presence of heat by the aid of the hot grinding-rolls. The composition of matter thus obtained is acid and alkali proof, and is particularly adapted for the manufacture of molded articles which require to be able to resist the action of acids and alkalies. It is of the right temper to mold well and will give a clear, glossy, and well-defined result when molded in either hot or cold dies. The articles produced are strong and durable and the composition therefore may be used in the production of a great variety of molded articles.

What I claim is—

A composition of matter comprising roofing-pitch which has been distilled until a portion of the oil which it contains has been driven off and its melting-point raised, asbestos and gum-kauri in substantially the proportions named, mixed and incorporated together by the aid of heat, substantially as set forth.

In testimony whereof I affix my signature in presence of two witnesses.

FRANK ROCKWOOD HALL.

Witnesses:
WM. A. MACLEOD,
ALICE H. MORRISON.